United States Patent
Fay et al.

(10) Patent No.: US 6,551,951 B1
(45) Date of Patent: Apr. 22, 2003

(54) BURN THROUGH RESISTANT NONWOVEN MAT, BARRIER, AND INSULATION SYSTEM

(75) Inventors: Ralph Michael Fay, Lakewood, CO (US); Rebecca S. Wulliman, Englewood, CO (US)

(73) Assignee: Johns Manville International, Inc., Denver, CO (US)

(*) Notice: Subject to any disclaimer, the term of this patent is extended or adjusted under 35 U.S.C. 154(b) by 0 days.

(21) Appl. No.: 09/524,404

(22) Filed: Mar. 13, 2000

Related U.S. Application Data

(60) Provisional application No. 60/125,123, filed on Mar. 19, 1999.

(51) Int. Cl.[7] ............................................. B32B 27/04
(52) U.S. Cl. ........................ 442/82; 442/79; 442/92; 442/136; 169/48; 169/49; 501/95; 978/920; 978/921
(58) Field of Search ................... 442/79; 428/920, 428/921, 82, 97, 136; 164/48, 49; 65/911; 501/95

(56) References Cited

U.S. PATENT DOCUMENTS

| | | | | |
|---|---|---|---|---|
| 4,756,934 A | * | 7/1988 | Ukawa | 427/394 |
| 5,252,274 A | * | 10/1993 | Thomas | 264/87 |
| 5,284,700 A | * | 2/1994 | Strauss et al. | 428/240 |
| 5,380,580 A | * | 1/1995 | Rogers et al. | 428/219 |
| 5,398,889 A | * | 3/1995 | White et al. | 244/119 |
| 5,759,659 A | | 6/1998 | Sanocki | |
| 5,874,375 A | * | 2/1999 | Zoitos et al. | 501/36 |
| 5,886,306 A | * | 3/1999 | Patel et al. | 181/290 |
| 6,228,784 B1 | * | 5/2001 | Mochizuki et al. | 442/136 |
| 6,294,491 B1 | * | 9/2001 | Fay et al. | 501/35 |

* cited by examiner

Primary Examiner—Terrel Morris
Assistant Examiner—Alex Wachtel
(74) Attorney, Agent, or Firm—Robert D. Touslee

(57) ABSTRACT

A burn through resistant nonwoven mat and cover film composite for use in a thermal and/or acoustical insulation blanket system, are, preferably, made up of non-respirable and/or biosoluble base fibers and capable of retaining their integrity and dimensional stability during 4 minutes of exposure to a fluctuating high pressure flame front at a temperature of 1100° C. examples of non-respirable base fibers which make up the nonwoven mat are quartz fibers; aluminosilicate, aluminoborosilicate or alumina ceramic oxide fibers; partially oxidized pitch based fibers; and partially oxidized polyacrylonitrile fibers having mean diameters greater than 6 microns. Examples of biosoluble fibers are biosoluble glass fibers. Preferably, the nonwoven mats also include a lubricant sizing with a water repellent additive.

34 Claims, 1 Drawing Sheet

BURN THROUGH RESISTANT NONWOVEN MAT, BARRIER, AND INSULATION SYSTEM

This patent application is a continuing patent application of provisional patent application Ser. No. 60/125,123, filed Mar. 19, 1999.

BACKGROUND OF THE INVENTION

The present invention relates to a burn through resistant nonwoven mat, and in particular to a burn through resistant nonwoven mat that adds significant burn through resistance to the thermal and acoustical insulation blanket systems used in commercial aircraft and in other applications requiring burn through properties of the type or similar to those properties currently required for commercial aircraft.

U.S. Pat. No. 5,759,659, issued Jun. 2, 1998, (hereinafter "the '659 patent") describes insulation blankets with added burn through resistance. The '659 patent seems to describe a blanket comprising an insulation composite encased in a heat-sealable polyolefin film with a high temperature-resistant layer adjacent to the insulation. The '659 patent suggests that it may be appropriate for use in an aircraft as an insulation blanket. However, the '659 patent does not disclose an insulation blanket "system" that meets the combined thermal, acoustical, component and composite small scale flammability, fire barrier, fire propagation, smoke toxicity, moisture management, weight, fabricate-ability, health and cost requirements that have been established by commercial aircraft manufactures and aircraft regulatory agencies in the United States. Examples of why the invention described by the '659 patent does not meet the combined required properties for use in commercial aircraft follow.

The '659 patent cites the BSS 7323 Cargo Liner Burn Test to demonstrate the "good" burn through resistance of the invention described in the '659 patent. However, the '659 patent's "good" composite examples may not meet the new Federal Aviation Administration (FAA) medium scale burn through test (FAA test as presently defined by www.Fire.tc-.faa.gov and hereinafter "the FAA medium scale burn through test"). The FAA medium scale burn through test subjects a hot side major surface of the composite sample being tested to the flame of an oil burner that generates a temperature of approximately 1100° C. The discharge end of the oil burner nozzle is positioned 10 cm from and directed toward the hot side major surface of the composite sample, and generates a pulsating high pressure flame front. The FAA medium scale burn through test measures cold side heat flux at the cold side of the composite sample. To pass the FAA medium scale burn through test an insulation system must prevent both visible burn through and a cold side heat flux exceeding 1.5 btu/ft$^2$ for four minutes.

For aircraft applications, the '659 patent uses the Federal Aviation Regulations (FAR) part 25.853A or the Boeing Material Technology Test BSS 7230, set up on a laboratory scale, vertical burn test to determine the small scale flammability characteristics of components. The '659 patent states "A sample was said to have passed the vertical burn test if the sample did not burn along its entire length during the 12 second test period". Contrary to this statement, none of the requirements established by Airbus or Boeing permit more than two thirds of the sample length to burn. BMS 8–48V for fiberglass insulation requires 10 seconds maximum burn time, one third maximum burn length and no drips. BMS 8–142V for composites of insulation and covering film requires 2 seconds maximum burn time, two thirds maximum burn length, and 5 seconds to extinguish drips, respectively. Also, none of the examples or preferred variations in the '659 patent meet the two thirds maximum burn length requirement when tested as an actual or simulated composite fuselage insulation part as required by FAR.

Thus, there remains a need for an aircraft blanket "system" that responds to and meets all of the regulatory, aircraft manufacturer and aircraft operator requirements and expectations. The invention set forth in this patent application is such a system.

SUMMARY OF THE INVENTION

One composite that has been evaluated and has passed the FAA medium scale burn through test uses one or more layers of a nonwoven mat, made of fibers commercially available from The 3M Company of St. Paul, Minn. under the trade designation "NEXTEL", as a fire barrier in the insulation blanket. This NEXTEL fiber mat is positioned between the hot-side film and the first layer of MICROLITE AA fiber glass blanket that is commercially available from Johns Manville International, Inc. of Denver, Colo. This composite performs well when compared to the insulation blanket systems discussed above because this mat is made from nonwoven ceramic fibers that are bonded together with a high temperature ceramic binder. The addition of the high temperature ceramic binder helps the mat retain its form and strength for at least four minutes during exposure to the 1100° C. temperature and pulsating high pressure flame front in the FAA medium scale burn through test.

Although this NEXTEL mat/MICROLITE AA fiber glass blanket composite passes the FAA medium scale burn through test, there are four properties of the NEXTEL fiber mat used in the composite that make the composite unsuitable as a "system" solution and are likely to limit wide scale commercial acceptance of such a composite. First, the NEXTEL fiber mat is not "user friendly" because NEXTEL fibers have a tendency to pull moisture and oil from the hands of the people fabricating insulation composites. Second, the NEXTEL fiber mat is fairly rigid and can crack upon bending as well as separate at perforations caused while sewing the mat; and the NEXTEL fiber mat does not possess the "drape" characteristics of the insulation blanket components currently used in thermal and acoustical insulation blanket systems for aircraft thereby making it difficult to fabricate an insulation composite with the NEXTEL fiber mat and install such a composite within an aircraft fuselage. The NEXTEL fiber mat's third undesirable property is the lack of moisture resistance required by Boeing Material Technology test BMS 8–48. The final problem with the NEXTEL fiber mat relates to the cost of the NEXTEL fiber mat. The cost of the primary component of this 50–70 g/m$^2$ mat (the NEXTEL fiber) is about $176/kg. Thus, the cost for the fibers alone in the mat is at least $8/m$^2$.

The preferred embodiments of the present invention address all of the unwanted properties of the NEXTEL fiber mat used in the NEXTEL fiber mat/MICROLITE AA glass fiber blanket insulation composite and retain the excellent burn through resistance required to pass the FAA medium scale burn through test. The preferred embodiments of the present invention also address all of the other "system" requirements and expectations.

The burn through resistant nonwoven mats of the present invention (for use in thermal and/or acoustical insulation blanket systems, such as but not limited to the thermal and/or acoustical blanket insulation systems of aircraft fuselages) are preferably made up of non-respirable and/or biosoluble base fibers; are capable of retaining their integrity and dimensional stability during four minutes of exposure to a fluctuating high pressure flame front at a temperature of 1100° C.; and are capable of passing the FAA medium scale burn through test. Examples of non-respirable base fibers which make up the nonwoven mat are quartz fibers, aluminosilicate ceramic oxide fibers, aluminoborosilicate ceramic oxide fibers, alumina ceramic oxide fibers, partially oxidized pitch based fibers, and partially oxidized polyacrylonitrile fibers having mean diameters greater than 6 microns. Examples of biosoluble base fibers (fibers that are not durable in physiological fluids) are biosoluble glass fibers.

Preferably, the burn through resistant nonwoven mats also include a lubricant sizing with a water repellent additive. The randomly oriented entangled base fibers forming the burn through resistant nonwoven mat, through the physical characteristics of the base fibers and their entanglement, normally provide the nonwoven mat with the required integrity. However, for applications where additional mat integrity is required e.g. for processing and/or handling, a high temperature resistant binder can be used to bond the randomly oriented entangled base fibers together to increase the integrity of the nonwoven mat; secondary microfibers that are entangled with each other and the base fibers of the nonwoven mat can be included in the nonwoven mat to increase the integrity of the mat; or both a high temperature resistant binder and the secondary microfibers can be used to increase the integrity of the nonwoven mat.

DESCRIPTION OF THE PREFERRED EMBODIMENTS

Figure 1:
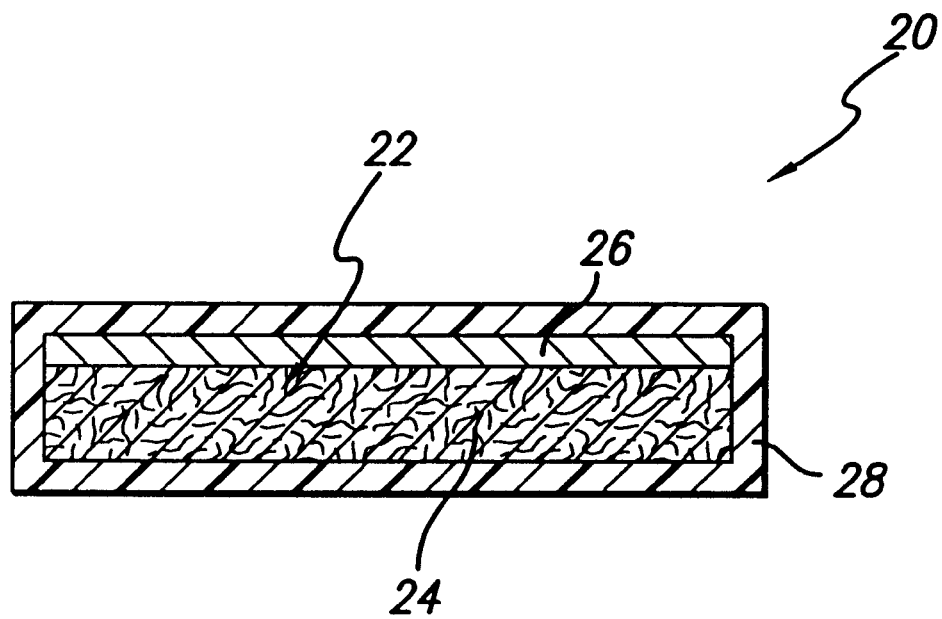
FIG. 1 schematically illustrates a transverse cross section through a thermal and/or acoustical insulation blanket system composite with a burn through resistent nonwoven mat layer and an insulation blanket layer encapsulated within a polymeric film.

A first preferred embodiment of the burn through resistant nonwoven mat of the present invention, for use in thermal and/or acoustical insulation blanket systems, utilizes quartz fibers as the base fibers of the nonwoven mat. The nonwoven quartz fiber mat includes: from about 74.5% to about 99.9% by weight quartz fibers having a mean diameter between 6 microns and 12 microns, an average length between about 10 millimeters (mm) and about 40 mm, and a service temperature of at least 1100° C.; about 0.1% to about 0.5% by weight lubricant sizing with a water repellent additive; 0% to about 15% by weight high temperature resistant binder; and 0% to about 10% by weight biosoluble glass microfibers.

Where, greater mat integrity may be required, preferably, the nonwoven quartz fiber mat is needle punched or hydroentangled and/or includes: a) from about 84.5% to about 96.9% by weight quartz fibers having a mean diameter between 6 microns and 12 microns, an average length between about 10 mm to about 40 mm, and a service temperature of at least 1100° C.; about 0.1% to about 0.5% by weight lubricant sizing with a water repellent additive; and about 3% to about 15% by weight high temperature resistant binder; or b) from about 89.5% to about 98.9% by weight quartz fibers having a mean diameter between 6 microns and 12 microns, an average length between about 10 mm to about 40 mm, and a service temperature of at least 1100 C; about 0.1% to about 0.5% by weight lubricant sizing with a water repellent additive; and about 1% to about 10% by weight biosoluble glass microfibers; or c) from about 74.5% to about 95.9% by weight quartz fibers having a mean diameter between 6 microns and 12 microns, an average length between about 10 mm to about 40 mm, and a service temperature of at least 1100° C.; about 0.1% to about 0.5% by weight lubricant sizing with a water repellent additive; about 3% to about 15% by weight high temperature resistant binder; and about 1% to about 10% by weight biosoluble glass microfibers. Due to their diameter, the quartz base fibers of the nonwoven mat are not respirable.

An example of quartz base fibers which may be used to form the nonwoven mat are REFRASIL® quartz fibers commercially available from SGL Hitco. These quartz fibers have an 1150° C. service capability and cost about $6.60/kg. The quartz base fibers of the nonwoven mat are randomly oriented and entangled together, typically in planes that lie predominantly parallel to or generally parallel to first and second major surfaces of the nonwoven mat. The lubricant sizing with the water repellent additive used in the nonwoven mat, such as the water repellent additive commercially available from The 3M Company under the trade designation SCOTCHGUARD®, improves the feel, the drape-ability, and the water/moisture resistance of the quartz fiber mat.

The nonwoven quartz fiber mat of the present invention has a basis weight between about 30 grams per square meter (g/m²) and about 100 g/m². Preferably, the nonwoven quartz fiber mat retains its strength and dimensional stability for at least four minutes during exposure to the 1100° C. temperature and pulsating high pressure flame front of the FAA medium scale burn through test and passes the FAA medium scale burn through test.

As mentioned above, the structural integrity of the burn through resistant nonwoven quartz fiber mat of the present invention can be further increased by several techniques. The quartz base fibers of the nonwoven mat may be needle punched or hydroentangled to increase the structural integrity of the nonwoven mat. A high temperature resistant binder, in an amount ranging from about 3% to about 15% by weight of the nonwoven mat, may be used to bond the quartz base fibers together at their points of intersection. Biosoluble glass microfibers, in an amount ranging from about 1% to about 10% by weight of the nonwoven mat, may be entangled together and with the quartz base fibers. The biosoluble glass microfibers, entangled together and with the quartz base fibers, and the high temperature resistant binder may be used together with the high temperature resistant binder bonding both the glass microfibers and the quartz base fibers together at their points of intersection.

Examples of high temperature resistant binders which may be used in the burn through resistant nonwoven mat of the present invention are:
  a) high temperature resistant metal oxide dispersion or ceramic binders;
  b) NOMEX fibrids commercially available from E. I. DuPont de Nemours & Co. of Wilmington, Del.; and
  c) aqueous emulsions of polyvinylidene fluoride (PVDF) commercially available from Elf Atochem under the trade designation Kynar®. The aqueous emulsions of polyvinylidene fluoride also provide excellent water and moisture repellency.

The biosoluble glass microfibers (glass microfibers that are not durable in physiological fluids) that may be used in the mat, have a mean diameter between about 0.7 microns and about 1.5 microns and an average length, as measured by the McNett Bauer test method of from about 1 mm to about 10 mm. Examples of biosoluble glasses which may be used to form the biosoluble glass microfibers used to increase the integrity of the nonwoven mat are: the high temperature refractory glass disclosed in U.S. Pat. No. 5,874,375, issued Feb. 23, 1999, which among other formulations discloses a glass made up of from about 69 to about 80 weight percent silica, about 20 to about 31 weight percent magnesia, 0 to about 7 weight percent zirconia, 0 to about 2 weight percent alumina, and 0 to about 1 weight percent boria (the disclosure of U.S. Pat. No. 5,874,375 is hereby incorporated herein in its entirety); and biosoluble glass microfibers made with JM 902 glass and available from Johns Manville International, Inc. under the trade designation Code 106 biosoluble glass microfibers.

The JM 902 biosoluble glass used to form the Code 106 biosoluble glass microfibers in the burn through resistant nonwoven mats of the present invention, in mol percent, is as follows:

| | |
|---|---|
| $SiO_2$ | 66–69.7 |
| $Al_2O_3$ | 0–2.2 |
| RO | 7–18 |
| $R_2O$ | 9–20 |
| $B_2O_3$ | 0–7.1 | where $R_2O$ is an alkali metal oxide and RO is an alkaline earth metal oxide. $R_2O$ is preferably $Na_2O$ in most substantial part, while RO may be MgO and/or CaO, preferably both, in a molar ratio of MgO/CaO of between 1:3 and 3:1, more preferably 2:3 to 3:2. The chemical behavior of the glass is dictated by three ratios which the glass composition must meet, C(acid), C(bio), and C(moist). These ratios are defined compositionally as follows, all amounts being in mol percent:

$$C(acid)=[SiO_2]/([Al_2O_3]+B_2O_3]+[R_2O]+[RO])$$

$$C(bio)=([SiO_2]+[Al_2O_3])/(B_2O_3]+[R_2O]+[RO])$$

$$C(moist)=([SiO_2]+[Al_2O_3]+(B_2O_3])/([R_2O]+[RO]).$$

In these ratios, C(acid) is the ratio which pertains to chemical resistance in acid environments, C(bio) is the ratio which is most closely linked to biosolubility, and C(moist) is the ratio which relates to the retention of properties in moist environments. It is desired that C(acid) and C(moist) be as large as possible, while C(bio) should be as low as possible. At the same time, the HTV and liquidus of the overall composition must be suitable for glass fiber processing (preferably by a flame attenuation process). It has been found that glass fibers of high biosolubility made by flame attenuated processes maintain other necessary physical properties, such as chemical resistance and moisture resistance, when C(acid) is equal to or greater than 1.95, C(bio) is equal to or less than 2.30, and C(moist) is equal to or greater than 2.40.

Preferably, the JM 902 biosoluble glass used to form the microfibers in the burn through resistant nonwoven mats of this invention, has a composition which falls within the following ranges (in mol percent):

| | |
|---|---|
| $SiO_2$ | 66–69.0 |
| $Al_2O_3$ | 0–2.2 |
| RO | 7–16 |
| $R_2O$ | 9–19 |
| $B_2O_3$ | 0–7.1 |

Most preferably, the JM 902 biosoluble glass used to form the microfibers in the burn through resistant nonwoven mats of the present invention, have a composition which falls within the following ranges (in mol percent):

| | |
|---|---|
| $SiO_2$ | 66–68.25 |
| $Al_2O_3$ | 0–2.2 |
| RO | 7–13 |
| $R_2O$ | 11–18 |
| $B_2O_3$ | 0–7.1 |

With respect to the performance characteristics of the JM 902 glass used to form the microfibers in the burn through resistant nonwoven mats of the present invention, it is preferred that C(acid) be greater than or equal to 2.00; C(bio) be less than or equal to 2.23, more preferably, less than or equal to 2.20; and that C(moist) be greater than or equal to 2.50, preferably greater than or equal to 2.60. As discussed previously, it is most desirable that C(acid) and C(moist) values be as high as possible. For example, C(moist) values of 3.00 or greater are particularly preferred. It should also be noted that the various C-ratios are independent in the sense that a more preferred glass need not have all "more preferred" C-ratios.

The preferred biodissolution rate constants k (in $ng/cm^2/hr$) for glass fibers used in the burn through resistant nonwoven mats of the present invention are greater than 150 $ng/cm^2/hr$, preferably equal to or greater than 200 $ng/cm^2/hr$, more preferably equal to or greater than 300 $ng/cm^2/hr$, and most preferably equal to or greater than 400 $ng/cm^2/hr$. Preferably, the JM biosoluble glass compositions are free of iron oxides, lead oxides, fluorine, phosphates ($P_2O_5$), zirconia, and other expensive oxides, except as unavoidable impurities.

A second preferred embodiment of the burn through resistant nonwoven mat of the present invention, for use in thermal and/or acoustical insulation blanket systems, utilizes a blend of quartz fibers and aluminosilicate ceramic oxide, aluminoborosilicate ceramic oxide, and/or alumina ceramic oxide fibers as the base fibers for the mat. The quartz and ceramic oxide fiber mat includes about 20% to about 80% by weight quartz base fibers having a mean diameter between 6 microns and 12 microns, an average length between about 10 mm and about 40 mm, and a service temperature of at least 1100° C., and about 20% to about 80% aluminosilicate ceramic oxide, aluminoborosilicate ceramic oxide, and/or alumina ceramic oxide base fibers having a mean diameter between 6 microns and 12 microns, an average length between about 5 mm and about 20 mm, and a service temperature of at least 1100° C. (with the nonwoven mat being between 74.5% and 99.9% by weight quartz base fibers and ceramic oxide base fibers); about 0.1% to about 0.5% by weight lubricant sizing with a water repellent additive; 0% to about 15% by weight high temperature resistant binder; and 0% to about 10% by weight biosoluble glass microfibers.

Where, greater mat integrity may be required, preferably, the nonwoven quartz and ceramic oxide fiber mat is needle punched or hydroentangled and/or includes: a) from about 20% to about 80% by weight quartz fibers having a mean diameter between 6 microns and 12 microns, an average length between about 10 mm and about 40 mm, and a service temperature of at least 1100° C., and from about 20% to about 80% aluminosilicate ceramic oxide, aluminoborosilicate ceramic oxide, and/or alumina ceramic oxide fibers having a mean diameter between 6 microns and 12 microns, an average length between about 5 mm and about 20 mm, and a service temperature of at least 1100° C. (with the nonwoven mat being between 84.5% and 96.9% by weight quartz base fibers and ceramic oxide base fibers); about 0.1% to about 0.5% by weight lubricant sizing with a water repellent additive; and about 3% to about 15% by weight high temperature resistant binder; or b) from about 20% to about 80% by weight quartz fibers having a mean diameter between 6 microns and 12 microns, an average length between about 10 mm and about 40 mm, and a service temperature of at least 1100° C., and from about 20% to about 80% aluminosilicate ceramic oxide, aluminoborosilicate ceramic oxide, and/or alumina ceramic oxide fibers having a mean diameter between 6 microns and 12 microns, an average length between about 5 mm and about 20 mm, and a service temperature of at least 1100° C. (with the nonwoven mat being between 89.5% and 98.9% by weight quartz base fibers and ceramic oxide base fibers); about 0.1% to about 0.5% by weight lubricant sizing with a water repellent additive; and about 1% to about 10% by weight biosoluble glass microfibers; or c) from about 20% to about 80% by weight quartz fibers having a mean diameter between 6 microns and 12 microns, an average length between about 10 mm and about 40 mm, and a service temperature of at least 1100° C., and from about 20% to about 80% aluminosilicate ceramic oxide, aluminoborosilicate ceramic oxide, and/or alumina ceramic oxide fibers having a mean diameter between 6 microns and 12 microns, an average length between about 5 mm and about 20 mm, and a service temperature of at least 1100° C. (with the nonwoven mat being between 74.5% and 95.9% by weight quartz base fibers and ceramic oxide base fibers); about 0.1% to about 0.5% by weight lubricant sizing with a water repellent additive; about 3% to about 15% by weight high temperature resistant binder; and about 1% to about 10% by weight biosoluble glass microfibers. Due to their diameter the quartz base fibers and aluminosilicate, aluminoborosilicate and/or alumina ceramic oxide base fibers of the nonwoven mat are not respirable.

The quartz base fibers (REFRASIL® quartz fibers) and the aluminosilicate, aluminoborosilicate and/or alumina ceramic oxide base fibers are randomly oriented and entangled together, typically in planes that lie, predominately, parallel to or generally parallel to first and second major surfaces of the nonwoven mat. The lubricant sizing with its water repellent additive, such as the water repellant additive commercially available from The 3M Company under the trade designation SCOTCHGUARD®), of the nonwoven quartz fiber and ceramic oxide fiber mat improves the feel, the drape-ability, and the water/moisture resistance of the nonwoven mat.

The nonwoven quartz fiber and ceramic oxide fiber mat has a basis weight between about 30 g/m² and about 100 g/m². Preferably, the nonwoven quartz and ceramic oxide fiber mat retains its strength and dimensional stability for at least four minutes during exposure to the 1100° C. temperature and pulsating high pressure flame front of the FAA medium scale burn through test and passes the FAA medium scale burn through test.

As mentioned above, the structural integrity of the nonwoven quartz fiber and ceramic oxide fiber mat of the present invention can be further increased by several techniques. The quartz base fibers and aluminosilicate, aluminoborosilicate and/or alumina ceramic oxide base fibers of the nonwoven mat may be needle punched or hydroentangled to increase the structural integrity of the nonwoven mat. A high temperature resistant binder, in an amount ranging from about 3% to about 15% by weight of the nonwoven mat, may be used to bond the quartz base fibers and the ceramic oxide fibers together at their points of intersection. Biosoluble glass microfibers, in an amount ranging from about 1% to about 10% by weight of the nonwoven mat, may be entangled together and with the quartz base fibers and the ceramic oxide base fibers. The biosoluble glass microfibers, entangled together and with the quartz base fibers and the ceramic oxide base fibers, and the high temperature resistant binder may be used together with the binder bonding the glass microfibers, the quartz base fibers and the ceramic oxide base fibers together at their points of intersection. The high temperature resistant binders and the biosoluble glass microfibers used in this second preferred embodiment of the invention are the same as those described above in connection with the first preferred embodiment of the burn through resistant nonwoven mat of the present invention.

A third preferred embodiment of the burn through resistant nonwoven mat of the present invention, for use in thermal and/or acoustical insulation blanket systems, utilizes biosoluble glass fibers as the base fibers of the mat. The nonwoven biosoluble glass fiber mat includes about 74.5% to about 99.9% by weight biosoluble glass base fibers having a mean diameter between 3 microns and 10 microns, an average length between about 5 mm and about 25 mm., and a service temperature of at least 1100° C.; about 0.1% to about 0.5% by weight lubricant sizing with a water repellent additive; 0% to about 15% by weight high temperature resistant binder; and 0% to about 10% by weight glass microfibers.

Where, greater mat integrity may be required, preferably, the nonwoven biosoluble glass fiber mat is needle punched or hydroentangled and/or includes: a) from about 84.5% to about 96.9% by weight biosoluble glass base fibers having a mean diameter between 3 microns and 10 microns, an average length between about 5 mm and about 25 mm, and a service temperature of at least 1100° C.; about 0.1% to about 0.5% by weight lubricant sizing with a water repellent additive; and about 3% to about 15% by weight high temperature resistant binder; or b) from about 89.5% to about 98.9% by weight biosoluble glass base fibers having a mean diameter between 3 microns and 10 microns, an average length between about 5 mm and about 25 mm, and a service temperature of at least 1100° C.; about 0.1% to about 0.5% by weight lubricant sizing with a water repellent additive; and about 1% to about 10% by weight glass microfibers; or c) from about 74.5% to about 95.9% by weight biosoluble glass base fibers having a mean diameter between 3 microns and 10 microns, an average length between about 5 mm and about 25 mm, and a service temperature of at least 1100° C.; about 0.1% to about 0.5% by weight lubricant sizing with a water repellent additive; about 3% to about 15% by weight high temperature resistant binder; and about 1% to about 10% by weight glass microfibers. Due to their biosoluble nature, the diameters of the biosoluble glass base fibers in the nonwoven mat may be less than 6 microns and respirable.

Examples of biosoluble glasses which may be used to form the biosoluble glass base fibers are the high temperature refractory glass disclosed in U.S. Pat. No. 5,874,375, issued Feb. 23, 1999, and the JM 902 biosoluble glass, both described above in connection with the first preferred embodiment. Biosoluble glass base fibers, made in accordance with the disclosure of U.S. Pat. No. 5,874,375, are commercially available from Unifrax Corporation under the trade designation ISOFRAX®. Biosoluble glass base fibers, made from JM 902 glass, are commercially available from Johns Manville International, Inc. While fibers made from the JM 902 glass are normally only capable of 500° C. service temperatures, the fibers made from this glass can be coated with phosphate or ceramic-like materials and the resulting composite systems using nonwoven mats made from these fibers as fire barriers can easily withstand, for at least four minutes, the 1100° C. temperatures and the high pressure pulsating flame front of the FAA medium scale burn through test. However, at this time, composite blanket systems, using a nonwoven mat made from the phosphate coated JM 902 glass fibers, do not meet the moisture and water repellency requirements for aircraft application.

The biosoluble base fibers of the nonwoven mat are randomly oriented and entangled together, typically in planes that lie predominantly parallel to or generally parallel to first and second major surfaces of the nonwoven mat. The lubricant sizing with the water repellent additive used in the nonwoven mat, such as the water repellent additive commercially available from The 3M Company under the trade designation SCOTCHGUARD®), improves the feel, the drape-ability, and the water/moisture resistance of the biosoluble glass fiber mat.

The nonwoven biosoluble glass fiber mat of the present invention has a basis weight between about 30 g/m² and about 100 g/m². Preferably, the nonwoven biosoluble glass fiber mat retains its strength and dimensional stability for at least four minutes during exposure to the 1100° C. temperature and pulsating high pressure flame front of the FAA medium scale burn through test and passes the FAA medium scale burn through test.

As mentioned above, the structural integrity of the burn through resistant nonwoven biosoluble glass fiber mat of the present invention can be further increased by several techniques. The biosoluble glass base fibers of the nonwoven mat may be needle punched or hydroentangled to increase the structural integrity of the nonwoven mat. A high temperature resistant binder, in an amount ranging from about 3% to about 15% by weight of the nonwoven mat, may be used to bond the biosoluble glass base fibers together at their points of intersection. Secondary, biosoluble glass microfibers, in an amount ranging from about 1% to about 10% by weight of the nonwoven mat, may be entangled together and with the biosoluble glass base fibers. The secondary biosoluble glass microfibers, entangled together and with the biosoluble glass base fibers, and the high temperature resistant binder may be used together with the binder bonding both the secondary biosoluble glass microfibers and the biosoluble glass base fibers together at their points of intersection. The high temperature resistant binders and the biosoluble glass microfibers used in this third preferred embodiment of the invention are the same as those described above in connection with the first preferred embodiment of the burn through resistant nonwoven mat of the present invention.

A fourth preferred embodiment of the burn through resistant nonwoven mat of the present invention, for use in thermal and/or acoustical insulation blanket systems, utilizes partially oxidized pitch based fibers and/or partially oxidized polyacrylonitrile fibers as the base fibers of the mat. The partially oxidized pitch based fiber and/or partially oxidized polyacrylonitrile fiber mat includes about 74.5% to about 99.9% by weight partially oxidized pitch based fibers and/or partially oxidized polyacrylonitrile fibers having a use temperature of at least 1100° C.; about 0.1% to about 0.5% by weight lubricant sizing with a water repellent additive; 0% to about 15% by weight high temperature resistant binder; and 0% to about 10% by weight biosoluble glass microfibers.

Where, greater mat integrity may be required, preferably, the nonwoven mat is needle punched or hydroentangled and/or includes: a) from about 84.5% to about 96.9% by weight partially oxidized pitch based fibers and/or partially oxidized polyacrylonitrile fibers having a service temperature of at least 1100° C.; about 0.1% to about 0.5% by weight lubricant sizing with a water repellent additive; and about 3% to about 15% by weight high temperature resistant binder; or b) from about 89.5% to about 98.9% by weight partially oxidized pitch based fibers and/or partially oxidized polyacrylonitrile fibers having a service temperature of at least 1100° C.; about 0.1% to about 0.5% by weight lubricant sizing with a water repellent additive; and about 1% to about 10% by weight biosoluble glass microfibers; or c) from about 74.5% to about 95.9% by weight partially oxidized pitch based fibers and/or partially oxidized polyacrylonitrile fibers having a service temperature of at least 1100° C.; about 0.1% to about 0.5% by weight lubricant sizing with a water repellent additive; about 3% to about 15% by weight high temperature resistant binder; and about 1% to about 10% by weight biosoluble glass microfibers. The partially oxidized pitch based fibers and the partially oxidized polyacrylonitrile fibers may have a mean diameter between 1 micron and 12 microns and an average length between about 10 mm and about 30 mm, but, preferably, have a mean diameter between 6 and 12 microns, an average length between about 10 mm and about 30 mm, and are not respirable.

The partially oxidized pitch based base fibers and/or the partially oxidized polyacrylonitrile base fibers of the nonwoven mat are randomly oriented and entangled together, typically in planes that lie predominantly parallel to or generally parallel to first and second major surfaces of the nonwoven mat. The lubricant sizing with the water repellent additive used in the nonwoven mat, such as the water repellent additive commercially available from The 3M Company under the trade designation SCOTCHGUARD®, improves the feel, the drape-ability, and the water/moisture resistance of the nonwoven fiber mat.

The nonwoven partially oxidized pitch based and/or the partially oxidized polyacrylonitrile fiber mat of the present invention has a basis weight between about 30 g/m² and about 100 g/m². Preferably, the nonwoven partially oxidized pitch based and/or the partially oxidized polyacrylonitrile fiber mat retains its strength and dimensional stability for at least four minutes during exposure to the 1100° C. temperature and pulsating high pressure flame front of the FAA medium scale burn through test and passes the FAA medium scale burn through test.

As mentioned above, the structural integrity of the burn through resistant nonwoven partially oxidized pitch based and/or the partially oxidized polyacrylonitrile fiber mat of the present invention can be further increased by several techniques. The partially oxidized pitch based base fibers and/or the partially oxidized polyacrylonitrile base fibers of the nonwoven mat may be needle punched or hydroentangled to increase the structural integrity of the nonwoven mat. A high temperature resistant binder, in an amount ranging from about 3% to about 15% by weight of the nonwoven mat, may be used to bond the base fibers together at their points of intersection. Biosoluble glass microfibers, in an amount ranging from about 1% to about 10% by weight of the nonwoven mat, may be entangled together and with the partially oxidized pitch based base fibers and/or the partially oxidized polyacrylonitrile base fibers. The biosoluble glass microfibers, entangled together and with the base fibers, and the high temperature resistant binder may be used together with the binder bonding both the glass microfibers and the base fibers together at their points of intersection. The high temperature resistant binders and the biosoluble glass microfibers used in this fourth preferred embodiment of the invention are the same as those described above in connection with the first preferred embodiment of the burn through resistant nonwoven mat of the present invention.

A fifth embodiment of the burn through resistant nonwoven mat of the present invention, for use in thermal and/or acoustical insulation blanket systems, utilizes quartz microfibers, having a service temperature of at least 1100° C., as the base fibers of the mat. The quartz microfiber mat includes about 74.5% to about 99.9% by weight quartz microfibers having a mean diameter less than 6 microns; about 0.1% to about 0.5% by weight of a lubricant sizing with a water repellent additive; 0% to about 15% by weight high temperature resistant binder; and 0% to about 10% by weight glass microfibers.

Where, greater mat integrity may be required, preferably, the nonwoven quartz microfiber mat is needle punched or hydroentangled and/or includes: a) from about 84.5% to about 96.9% by weight quartz microfibers having a mean diameter less than 6 microns; about 0.1% to about 0.5% by weight lubricant sizing with a water repellent additive; and about 3% to about 15% by weight high temperature resistant binder; or b) from about 89.5% to about 98.9% by weight quartz microfibers having a mean diameter less than 6 microns; about 0.1% to about 0.5% by weight lubricant sizing with a water repellent additive; and about 1% to about 10% by weight glass microfibers; or c) from about 74.5% to about 95.9% by weight quartz microfibers having a mean diameter less than 6 microns; about 0.1% to about 0.5% by weight lubricant sizing with a water repellent additive; about 3% to about 15% by weight high temperature resistant binder; and about 1% to about 10% by weight glass microfibers. An example of quartz microfibers which may be used to form the nonwoven mat are quartz microfibers commercially available from Johns Manville International, Inc. under the trade designation Q-Fiber. While these quartz microfibers with their small diameters provide added air flow resistance to the mat and better system acoustics, these quartz microfibers cost about $25/kg and thereby reduce the cost benefit over the Nextel fiber mat. Since these quartz microfibers are respirable and are not biosoluble, this embodiment of the present invention is not a preferred embodiment.

The quartz microfiber base fibers of the nonwoven mat are randomly oriented and entangled together, typically in planes that lie predominantly parallel to or generally parallel to first and second major surfaces of the nonwoven mat. The lubricant sizing with the water repellent additive used in the nonwoven mat, such as the water repellent additive commercially available from The 3M Company under the trade designation SCOTCHGUARD®), improves the feel, the drape-ability, and the water/moisture resistance of the quartz microfiber mat.

The nonwoven quartz microfiber mat of the present invention has a basis weight between about 30 g/m$^2$ and about 100 g/m$^2$. Preferably, the nonwoven quartz microfiber mat retains its strength and dimensional stability for at least four minutes during exposure to the 1100° C. temperature and pulsating high pressure flame front of the FAA medium scale burn through test and passes the FAA medium scale burn through test.

As mentioned above, the structural integrity of the burn through resistant nonwoven quartz microfiber mat of the present invention can be further increased by several techniques. The quartz microfiber base fibers of the nonwoven mat may be needle punched or hydroentangled to increase the structural integrity of the nonwoven mat. A high temperature resistant binder, in an amount ranging from about 3% to about 15% by weight of the nonwoven mat, may be used to bond the quartz microfiber base fibers together at their points of intersection. Glass microfibers, in an amount ranging from about 1% to about 10% by weight of the nonwoven mat, may be entangled together and with the quartz microfiber base fibers. The glass microfibers, entangled together and with the quartz microfiber base fibers, and the high temperature resistant binder may be used together with the binder bonding both the glass microfibers and the quartz microfiber base fibers together at their points of intersection. The high temperature resistant binders used in this fifth embodiment of the invention are the same as those described above in connection with the first preferred embodiment of the burn through resistant nonwoven mat of the present invention.

FIG. 1 shows a thermal and acoustical insulation blanket system 20 utilizing one of the burn through resistant nonwoven mats of the present invention described above. The thermal and acoustical insulation blanket system 20 includes a composite 22 made up of an insulation layer 24 and a burn through resistant nonwoven mat layer 26 of the present invention. The composite is encapsulated or encased in a polymeric film 28. The insulation layer 24 can be formed of various insulations, such as but not limited to, a MICROLITE AA glass fiber blanket available from Johns Manville International, Inc., polyimide foam, and Premium NR glass fiber blanket available from Johns Manville International, Inc. Examples of polymeric films which can be used are: heat sealable thermoplastic polyolefin films and thermoset polymer films. The polymeric film functions to contain the composite 22 and to minimize moisture ingress into the composite 22. Preferably, the burn through resistant nonwoven mat layer 26 is located intermediate the insulation blanket layer 24 and the hot-side or outboard film of the system 20. While only one layer 24 of insulation blanket and one layer 26 of burn through resistant nonwoven mat are shown, the composite 22 of the system 20 may include one, two or more insulation blanket layers 24 and one, two or more burn through resistant nonwoven mat layers 26 with nonwoven mat layer(s) 26 located intermediate insulation blanket layer(s) 24 as well as or instead of being located intermediate the insulation blanket layer(s) and the hot-side or outboard film of the system 20.

Figure 2:
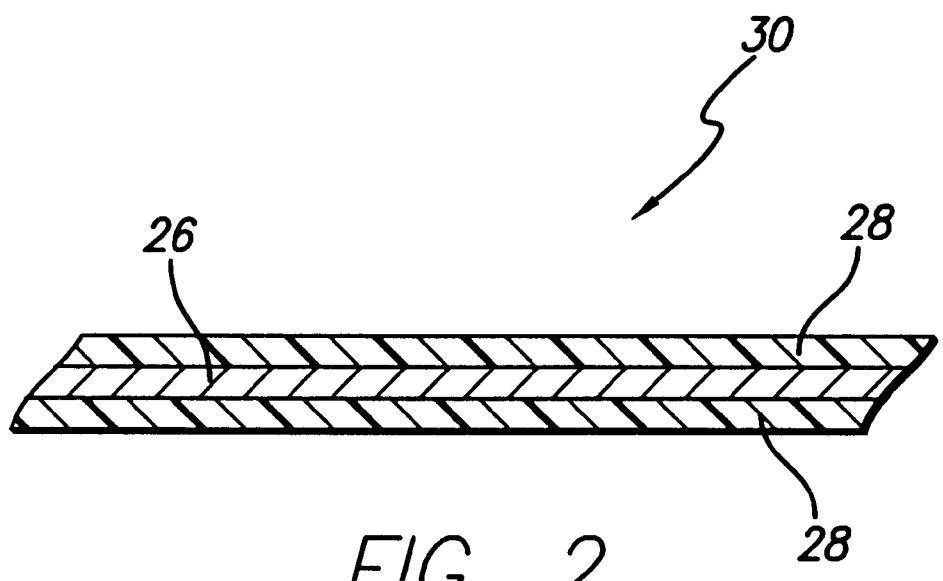
FIG. 2 schematically illustrates a transverse cross section through a polymeric film composite utilizing one of the burn through resistant nonwoven mats of the present invention both a reinforcement and a fire barrier.

FIG. 2 illustrates an alternative technique for including a layer 26 of the burn through resistant nonwoven mats of the present invention in the thermal and acoustical insulation blanket systems 20 described above and similar systems. Layer(s) 26 of the burn through resistant nonwoven mats can be employed in aircraft and other insulation blanket systems requiring burn through resistance by laminating the burn through resistant nonwoven mat (fire barrier) to a polyimide, polyvinylidene fluoride(PVDF), polyvinyl fluoride(PVF), or polyester film(s) to form a composite covering film 30. In essence, the layer 26 (or layers 26) of nonwoven fire barrier mat is substituted for the reinforcing scrim typically applied to these films to provide "ripstock" tear resistance. The layer 26 or layers 26 of burn through resistant nonwoven mat within or bonded or otherwise laminated to a surface of the film 28 thereby perform the dual function of providing a reinforcement for the film and a fire barrier for the system. A lightweight example construction encapsulates a 30 g/m² fire barrier nonwoven quartz fiber mat of the present invention within one layer or between two layers of 0.5 mil thick polymeric film, such as but not limited to, polyimide, PVDF and/or PVF films. The insulation or insulation blanket side of the composite film can optionally be coated with a heat or ultrasonic sealable adhesive or covered with a thermoplastic film so that the composite film 30 can be joined or bonded to aircraft insulation or insulation blankets similarly to currently used films.

There are other methods of using or incorporating the burn through resistant nonwoven mats of the present invention in aircraft to provide burn through resistance. One option involves adhering the burn through resistant nonwoven mat to the dryliner (the dry side or interior side of the dryliner) and to install the combined part between the thermal acoustical insulation blankets and the aluminum skin of an aircraft. Typically, a dryliner is a dimpled sheet, e.g. polymeric sheet, which is permeable to moisture and applied to the interior surface of an aircraft skin to permit moisture to migrate from within the aircraft out to the skin of an aircraft, condense and flow to a bilge in the aircraft. The dimples provide a space between the dryliner and the skin of the aircraft for the condensed moisture to flow down into the aircraft bilge. The burn through resistant nonwoven mat of the present invention can also be installed as a semi-continuous layer over (over-frame) or under (contoured to the frame plus skin cavity) the insulation blankets intermediate the fuselage frame and an interior of the aircraft or the fuselage frame and the aircraft skin.

To obtain a measurable reduction in system sound transmission of insulation composites of the present invention, such as the composite shown in FIG. 1, the mat should weigh 50 g/m² or more. Testing performed on simulated aircraft fuselage acoustic test apparatus has demonstrated that the addition of one or two layers of nonwoven mats of the present invention at 50 g/m² or more provides a measurable reduction in system sound transmission. At weights below 50 g/m², the mats had little or no impact on sound transmission.

A typical manufacturing process for forming the nonwoven mats of the present invention is described below in connection with the quartz fiber mat. Chopped quartz fibers with diameters of 6 to 12 microns and average lengths from about 10 mm to about 40 mm are dispersed in the white water of a glass mat or paper machine, e.g a Fourdrienier machine. 1% to 10% by weight of glass microfibers, such as those commercially available from Johns Manville International, Inc. under the trade designation Code 106 glass microfibers, may be added to the white water to add strength to the nonwoven mat while processing the mat, especially prior to the application of a binder. The quartz fibers, with or without the glass microfibers, are formed into a nonwoven mat on the glass mat or paper machine. As an alternative, the precursor quartz fiber mat can be formed by air laying the quartz fibers, with or without the glass microfibers, e.g. on a Dan Web type machine. The fibers of the air laid mat can be needle punched, hydroentangled, or otherwise further entangled to add processing and handling strength to the mat. If used, a high temperature resistant binder is dot printed, roll coated, dip coated, sprayed or otherwise applied in amounts between about 3% and about 15% by weight to the nonwoven quartz fiber mat. The high temperature resistant binder of the nonwoven mat is then completely dried or cured. Low add-on levels of the high temperature resistant binder are normally maintained to maximize drape and prevent stiffening of the mat. To improve the feel, drapeability, and water/moisture resistance of the nonwoven quartz fiber mat, the nonwoven mat is spray coated or entirely saturated with a lubricant sizing that includes a water repellent additive and redried. The sizing and water repellent add-on is typically less than 0.5% by weight of the nonwoven mat. Other than for added acoustical purposes (which require a nonwoven mat weighing 50 g/m² or greater) preferably the finished nonwoven mat has a weight less than or equal to 50 g/m².

The following table compares "system" performance of a control aircraft insulation blanket composed of INSULFAB® 240 polyester film/2 layers of 0.34 pounds per cubic foot (pcf) Premium NR primary insulation blanket/INSULFAB® 240 polyester film with three invention examples. The 0.34 Premium NR insulation blanket is commercially available from Johns Manville International, Inc. under the trade designation 0.34 Premium NR.

| "System" Property | Ceramic Bonded Quartz "system" | Phosphate Bonded JM 902 "system" | Quartz Mat in Polyimide Film "system" |
|---|---|---|---|
| Outboard Cover Film | INSULFAB 240 | INSULFAB 240 | 1 mil Apical polyimide/50 g/m² Refrasil/1 mil Apical polyimide |
| Fire Barrier | One layer 50 g/m² Refrasil | One layer 50 g/m² JM 902 glass | Included above |
| Primary Insulation | 2 layers 25.4 mm thick 0.34 pcf Premium NR | 2 layers 25.4 mm thick 0.34 pcf Premium NR | 2 layers 25.4 mm thick 0.34 pcf Premium NR |
| Inboard Cover Film | INSULFAB 240 | INSULFAB 240 | INSULFAB 240 |
| Thermal Performance (R Value) | = | = | = |
| Acoustics (TL per SAF) 12 Second | + | + | + |

-continued

| "System" Property | Ceramic Bonded Quartz "system" | Phosphate Bonded JM 902 "system" | Quartz Mat in Polyimide Film "system" |
|---|---|---|---|
| Vertical Burn | | | |
| burn time | under 10 secs | under 10 secs | under 10 secs |
| burn length under ⅓ | pass | pass | pass |
| drip time | under 5 secs | under 5 secs | under 5 secs |
| Burn Through | | | |
| (FAA medium scale test) | longer than 4 minutes | longer than 4 minutes | longer than 4 minutes |
| Fire Propagation | = | = | − |
| Smoke Toxicity | = | = | = |
| Moisture Management | = | = | = |
| Water Repellency | = | = | = |
| Weight | ++ | ++ | + |
| Ease of Blanket Fabrication | − | − | − |
| Heath and Toxicity | = | = | = |
| Cost | ++ | + | ++++ |

+ is better than the control blanket
− is worse than the control blanket
= is equivalent to the control blanket The procedure used to evaluate biodissolution rate of the microfibers made from the JM 902 biosoluble glass is similar to that described in Law et al. (1990). The procedure consists essentially of leaching a 0.5 gram aliquant of the candidate fibers in a synthetic physiological fluid, known as Gamble's fluid, or synthetic extracellular fluid (SEF) at a temperature of 37° C. and rate adjusted to achieve a ratio of flow rate to fiber surface area of 0.02 cm/hr to 0.04 cm/hr for a period of up to 1,000 hours duration. Fibers are held in a thin layer between 0.2 micron polycarbonate filter media backed by plastic support mesh and the entire assembly placed within a polycarbonate sample cell through which the fluid may be percolated. Fluid pH is regulated to 7.4+0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant can be calculated for each fiber type from the relation:

$$k=\{d_0(1-(M/M_0)^{0.5})/2t$$

where: k is the dissolution rate constant in SEF, d 0the initial fiber diameter, the initial density of the glass comprising the fiber, $M_0$ the initial mass of the fibers, M the final mass of the fibers ($M/M_0$=the mass fraction remaining), and t the time over which the data was taken. Details of the derivation of this relation is given in Leinweber (1982) and Potter and Mattson (1991). Values for k may be reported in ng/cm²/hr and preferably exceed a value of 150. Replicate runs on several fibers in a given sample set show that k values are consistent to within 3 percent for a given composition.

Data obtained from the above outlined evaluation can be effectively correlated within the sample set chosen—dissolution data used to derive k's were obtained only from experimental samples of uniform 3.0 micron diameter and under identical conditions on initial sample surface area per volume of fluid per unit time, and sample permeability. Data was obtained from runs of up to 30 days to obtain an accurate representation of the long term dissolution of the fibers.

In describing the invention, certain embodiments have been used to illustrate the invention and the practices thereof in connection with the aircraft industry. However, the invention is not limited to these specific embodiments as other embodiments and modifications within the spirit of the invention will readily occur to those skilled in the art on reading this specification. In addition, as concerns for fire safety increase in connection with other modes of transportation, the burn through resistant nonwoven mat fire barriers described herein will likely find many other applications. Thus, the invention is not intended to be limited to the specific embodiments disclosed, but is to be limited only by the claims appended hereto.

What is claimed is:

1. A burn through resistant fire barrier for use in a thermal and/or acoustical insulation blanket system, comprising:
   a burn through resistant nonwoven mat comprising from about 74.5% to about 98.9% by weight base fibers having a mean diameter between 6 microns and 12 microns and a service temperature of at least 1100° C., from about 1% to about 10% by weight biosoluble glass microfibers having a mean diameter between about 0.7 microns and about 1.5 microns, and from about 0.1% to about 0.5% by weight lubricant sizing with a water repellent additive; the base fibers and the biosoluble glass microfibers being randomly oriented and entangled together to form the nonwoven mat; the nonwoven mat being capable of retaining its integrity and dimensional stability for at least four minutes during exposure to a 1100° C. temperature and pulsating high pressure flame front in accordance with the FAA medium scale burn through test; and the nonwoven mat having a basis weight between about 30 g/m² and about 100 g/m².

2. The burn through resistant fire barrier according to claim 1, wherein:

the nonwoven mat is from about 74.5% to about 95.9% by weight the base fibers and the biosoluble glass microfibers; and the nonwoven mat includes from about 3% to about 15% by weight high temperature resistant binder.

3. The burn through resistant fire barrier according to claim 1, wherein:

a major surface of the nonwoven mat is bonded to a polymeric film and reinforces the polymeric film.

4. The burn through resistant fire barrier according to claim 1, wherein:

the nonwoven mat is intermediate and bonded to two layers of polymeric film forming a polymeric film and nonwoven mat composite reinforced by the polymeric film.

5. The burn through resistant fire barrier according to claim 1, wherein:

the nonwoven mat is bonded to a dryliner to be installed between thermal acoustical insulation of an aircraft and an fuselage skin of the aircraft.

6. A burn through resistant fire barrier for use in a thermal and/or acoustical insulation blanket system, comprising:

a burn through resistant nonwoven mat comprising from about 74.5% to about 98.9% by weight quartz base fibers having a mean diameter between 6 microns and 12 microns, an average length of from about 10 mm to about 40 mm, and a service temperature of at least 1100° C.; from about 1% to about 10% by weight biosoluble glass microfibers having a mean diameter between about 0.7 microns and about 1.5 microns; and from about 0.1% to about 0.5% by weight lubricant sizing with a water repellent additive; the base fibers and the biosoluble glass fibers being randomly oriented and entangled together to form the nonwoven mat; the nonwoven mat being capable of retaining its integrity and dimensional stability for at least four minutes during exposure to a 1100° C. temperature and pulsating high pressure flame front in accordance with the FAA medium scale burn through test; and the nonwoven mat having a basis weight between about 30 g/m$^2$ and about 100 g/m$^2$.

7. The burn through resistant fire barrier according to claim 6, wherein:

the nonwoven mat is from about 74.5% to about 95.9% by weight the base fibers and the biosoluble glass microfibers; and the nonwoven mat includes from about 3% to about 15% by weight high temperature resistant binder.

8. The burn through resistant fire barrier according to claim 6, wherein:

a major surface of the nonwoven mat is bonded to a polymeric film and reinforces the polymeric film.

9. The burn through resistant fire barrier according to claim 6, wherein:

the nonwoven mat is intermediate and bonded to two layers of polymeric film forming a polymeric film and nonwoven mat composite reinforced by the polymeric film.

10. The burn through resistant fire barrier according to claim 6, wherein:

the nonwoven mat is bonded to a dryliner to be installed between thermal acoustical insulation of an aircraft and an fuselage skin of the aircraft.

11. A burn through resistant fire barrier for use in a thermal and/or acoustical insulation blanket system, comprising:

a burn through resistant nonwoven mat comprising from about 20% to about 80% by weight quartz base fibers having a mean diameter between 6 microns and 12 microns, an average length of from about 10 mm to about 40 mm, and a service temperature of at least 1100° C., from about 20% to about 80% aluminosilicate, aluminoborosilicate and/or alumina ceramic oxide base fibers having a mean diameter between 6 microns and 12 microns, an average length of from about 5 mm to about 20 mm, and a service temperature of at least 1100° C.; from about 1% to about 10% by weight biosoluble glass microfibers having a mean diameter between about 0.7 microns and about 1.5 microns; and from about 0.1% to about 0.5% by weight lubricant sizing with a water repellent additive; the nonwoven mat being from about 74.5% to about 98.9% by weight the base fibers; the base fibers and the biosoluble glass microfibers being randomly oriented and entangled together to form the nonwoven mat; the nonwoven mat being capable of retaining its integrity and dimensional stability for at least four minutes during exposure to a 1100° C. temperature and pulsating high pressure flame front in accordance with the FAA medium scale burn through test and the nonwoven mat having a basis weight between about 30 g/m$^2$ and about 100 g/m$^2$.

12. The burn through resistant fire barrier according to claim 11, wherein:

the nonwoven mat is from about 74.5% to about 95.9% by weight the base fibers and the biosoluble glass microfibers; and the nonwoven mat includes from about 3% to about 15% by weight high temperature resistant binder.

13. The burn through resistant fire barrier according to claim 11, wherein:

a major surface of the nonwoven mat is bonded to a polymeric film and reinforces the polymeric film.

14. The burn through resistant fire barrier according to claim 11, wherein:

the nonwoven mat is intermediate and bonded to two layers of polymeric film forming a polymeric film and nonwoven mat composite reinforced by the polymeric film.

15. The burn through resistant fire barrier according to claim 11, wherein:

the nonwoven mat is bonded to a dryliner to be installed between thermal acoustical insulation of an aircraft and an fuselage skin of the aircraft.

16. A burn through resistant fire barrier for use in a thermal and/or acoustical insulation blanket system, comprising:

a burn through resistant nonwoven mat comprising from about 74.5% to about 98.9% by weight biosoluble glass base fibers having a service temperature of at least 1100° C., a mean diameter between 3 microns and 10 microns, and an average length between about 5 mm and about 25 mm; from about 1% to about 10% by weight biosoluble glass microfibers having a mean diameter between about 0.7 microns and about 1.5 microns; and from about 0.1% to about 0.5% by weight lubricant sizing with a water repellent additive; the base fibers and the biosoluble glass microfibers being randomly oriented and entangled together to form the nonwoven mat; the nonwoven mat being capable of retaining its integrity and dimensional stability for at least four minutes during exposure to a 1100° C. temperature and pulsating high pressure flame front in accordance with the FAA medium scale burn through test; and the nonwoven mat having a basis weight between about 30 g/m² and about 100 g/m².

17. The burn through resistant fire barrier according to claim 16, wherein:

the nonwoven mat is from about 74.5% to about 95.9% by weight the base fibers and the biosoluble glass microfibers; and the nonwoven mat includes from about 3% to about 15% by weight high temperature resistant binder.

18. The burn through resistant fire barrier according to claim 16, wherein:

a major surface of the nonwoven mat is bonded to a polymeric film and reinforces the polymeric film.

19. The burn through resistant fire barrier according to claim 16, wherein:

the nonwoven mat is intermediate and bonded to two layers of polymeric film forming a polymeric film and nonwoven mat composite reinforced by the polymeric film.

20. The burn through resistant fire barrier according to claim 16, wherein:

the nonwoven mat is bonded to a dryliner to be installed between thermal acoustical insulation of an aircraft and an fuselage skin of the aircraft.

21. The burn through resistant nonwoven mat according to claim 16, wherein:

the biosoluble glass base fibers are phosphate coated biosoluble glass fibers.

22. A burn through resistant fire barrier for use in a thermal and/or acoustical insulation blanket system, comprising:

from about 74.5% to about 99.9% by weight partially oxidized pitch based base fibers or partially oxidized polyacrylonitrile base fibers having a mean diameter between 1 micron and 12 microns, an average length ranging from about 10 mm to about 30 mm and a service temperature of at least 1100° C., and from about 0.1% to about 0.5% by weight lubricant sizing with a water repellent additive; the base fibers being randomly oriented and entangled together to form the nonwoven mat; the nonwoven mat being capable of retaining its integrity and dimensional stability for at least four minutes during exposure to a 1100° C. temperature and pulsating high pressure flame front in accordance with the FAA medium scale burn through test; and the nonwoven mat having a basis weight between about 30 g/m² and about 100 g/m².

23. The burn through resistant fire barrier according to claim 22, wherein:

the base fibers have a mean diameter between 6 microns and 12 microns.

24. The burn through resistant fire barrier according to claim 22, wherein:

the nonwoven mat is from about 74.5% to about 96.9% by weight the base fibers; and the nonwoven mat includes from about 3% to about 15% by weight high temperature resistant binder.

25. The burn through resistant fire barrier according to claim 22, wherein:

the nonwoven mat is from about 74.5% to about 98.9% by weight the base fibers; and the nonwoven mat includes from about 1% to about 10% by weight biosoluble glass microfibers, having a mean diameter between about 0.7 microns and about 1.5 microns; and the biosoluble glass microfibers are entangled together and with the base fibers.

26. The burn through resistant fire barrier according to claim 22, wherein:

the nonwoven mat is from about 74.5% to about 95.9% by weight the base fibers;

the nonwoven mat includes from about 3% to about 15% by weight high temperature resistant binder; and the nonwoven mat includes from about 1% to about 10% by weight biosoluble glass microfibers, having a mean diameter between about 0.7 microns and about 1.5 microns; and the biosoluble glass microfibers are entangled together and with the base fibers.

27. The burn through resistant fire barrier according to claim 22, wherein:

a major surface of the nonwoven mat is bonded to a polymeric film and reinforces the polymeric film.

28. The burn through resistant fire barrier according to claim 22, wherein:

the nonwoven mat is intermediate and bonded to two layers of polymeric film forming a polymeric film and nonwoven mat composite reinforced by the polymeric film.

29. The burn through resistant fire barrier according to claim 22, wherein:

the nonwoven mat is bonded to a dryliner to be installed between thermal acoustical insulation of an aircraft and an fuselage skin of the aircraft.

30. A burn through resistant fire barrier for use in a thermal and/or acoustical insulation blanket system, comprising:

a burn through resistant nonwoven mat comprising from about 74.5% to about 98.9% by weight quartz base microfibers having a mean diameter less than 6 microns; from about 1% to about 10% by weight biosoluble glass microfibers having a mean diameter between about 0.7 microns and about 1.5 microns; and from about 0.1% to about 0.5% by weight lubricant sizing with a water repellent additive; the base fibers and the biosoluble glass microfibers being randomly oriented and entangled together to form the nonwoven mat; the nonwoven mat being capable of retaining its integrity and dimensional stability for at least four minutes during exposure to a 1100° C. temperature and pulsating high pressure flame front in accordance with the FAA medium scale burn through test; and the nonwoven mat having a basis weight between about 30 g/m² and about 100 g/m².

31. The burn through resistant fire barrier according to claim 30, wherein:

the nonwoven mat is from about 74.5% to about 95.9% by weight the base microfibers and the biosoluble glass microfibers;

the nonwoven mat includes from about 3% to about 15% by weight high temperature resistant binder.

32. The burn through resistant fire barrier according to claim 30, wherein:

a major surface of the nonwoven mat is bonded to a polymeric film and reinforces the polymeric film.

33. The burn through resistant fire barrier according to claim 30, wherein:

the nonwoven mat is intermediate and bonded to two layers of polymeric film forming a polymeric film and nonwoven mat composite reinforced by the polymeric film.

34. The burn through resistant fire barrier according to claim 30, wherein:

the nonwoven mat is bonded to a dryliner to be installed between thermal acoustical insulation of an aircraft and an fuselage skin of the aircraft.

* * * * *